United States Patent [19]

Yokosawa

[11] Patent Number: 4,647,985
[45] Date of Patent: Mar. 3, 1987

[54] METHOD FOR RECORDING AND READING OUT A VIDEO FORMAT SIGNAL

[75] Inventor: Seiichi Yokosawa, Tokorozawa, Japan

[73] Assignee: Pioneer Electronic Corporation, Tokyo, Japan

[21] Appl. No.: 604,037

[22] Filed: Apr. 26, 1984

[30] Foreign Application Priority Data

Apr. 27, 1983 [JP] Japan .................................. 58-074439

[51] Int. Cl.$^4$ ............................................. H04N 5/76
[52] U.S. Cl. .................................... 358/341; 358/343; 360/19.1; 360/10.1; 360/8
[58] Field of Search .......................... 360/19.1, 10.1, 8; 358/341, 343; 434/308, 343

[56] References Cited

U.S. PATENT DOCUMENTS 4,542,419 9/1985 Morio .................................. 360/19.1

FOREIGN PATENT DOCUMENTS

2092814 8/1982 Japan .................................. 360/19.1
186565 4/1984 Japan .................................. 358/343

Primary Examiner—Alan Faber
Attorney, Agent, or Firm—Schwartz, Jeffery, Schwaab, Mack, Blumenthal & Evans

[57] ABSTRACT

A method for recording and reading out a video format signal includes steps of recording frequently used words, phrases, or sentences in an audio informations corresponding to video informations, in a frame before frames for video informations while being treated by time axis compression process, and recording remaining audio informations in desired frames among the frames for the video informations also while being treated by the time axis compression process. In the playback of the thus recorded audio informations, the frequently used part of the audio information is stored in a part of a memory device, and the remaining part of the audio information are stored in the remaining part of the memory device, and the stored audio informations are read out at need and combined with each other while being treated by the time axis expansion process.

2 Claims, 10 Drawing Figures

| Fig.6A | Fig.6B |

METHOD FOR RECORDING AND READING OUT A VIDEO FORMAT SIGNAL

BACKGROUND OF THE INVENTION

1. Field of the Invention

The present invention relates to a method for recording and reading-out a video format signal, and more particularly to a method for recording and reading-out video information and audio information, which take the form of a video format signal, on and from a recording track of a recording medium.

2. Description of Background Information

In the case of recording of audio information corresponding to video information on a recording track of a recording medium along with the corresponding video information, a method is utilized in which the audio information converted to a digital form is inserted in a part of the video format signal while being treated by a time axis compressing process, and the video information is recorded in remaining portions of the video format signal.

As a type of the recording and reading-out method of this sort, the present applicant has already proposed the so-called Still Picture with Sound (SWS) system, which system is described in Japanese Patent application No. 57-186565 filed on Oct. 23, 1982.

In the SWS system, a two-dimensional picture obtained from a video format signal is divided into a plurality of blocks and the audio information is recorded in selected parts of the blocks, and the video information is recorded in the remaining parts of the blocks. Further, a control information which includes information for the control of various playback operations of the playback system, other than the information of the blocks carrying the audio information, is also inserted to the remaining blocks.

By this method, it becomes possible to record the order of playback operations, i.e., a software, on the recording medium itself. Thus, a sequential playback of a series of co-relating picture informations, and audio informations corresponding to the picture informations, is enabled. This sequential playback is quite important for providing various applications of the system such as in the so-called video file system, and in educational "software" or "video soft", etc.

However, in the SWS system, the SWS data are recorded in the frame of each corresponding still picture, which causes an increase of the SWS data portions and a frequent appearance of the SWS data portions (clamped to a constant level) on the screen. In the case of audio information as the SWS data, the same words or phrases are frequently used for the explanations of the still pictures, and in other words, the redundancy is relatively high.

Therefore, it is conceivable to store the frequently used words or phrases in a ROM (read only memory) and read-out those words or phrases from the ROM as needed. However, in the case of this method, a problem occurs in that the quality of the sound is low, and moreover, the ROM has to be changed for each different "video soft".

SUMMARY OF THE INVENTION

An object of the present invention is therefore to provide a recording and reading-out method in which the portion in which the SWS data are recorded is reduced and the disturbance in the reproduced picture is in turn alleviated.

According to the present invention, a method for recording a video format signal is characterized in that the frequently used words, phrases, or sentences are picked up from audio informations corresponding to video informations, and recorded in a frame before the frames for the series of video informations while being treated by a time axis compression process, and that the remaining audio informations are recorded in desired frames among the frames for the series of video informations.

According to another aspect of the present invention, a method of the invention for reading-out video format signals recorded in the above method of recording, is characterized in that the audio informations of the frequently used words, phrases, or sentences are recorded in a part of a memory device, and the remaining part of the audio information is recorded in a remaining part of the memory device, and in that, the audio informations stored in the memory device is treated by the time axis expansion process while being read-out and combined with each other as needed.

BRIEF DESCRIPTION OF THE DRAWINGS

The present invention will become more fully understood from the following description taken in conjunction with the accompanying drawings which are given by way of illustration only, and thus are not limitative of the present invention, and wherein.

DETAILED DESCRIPTION OF THE PREFERRED EMBODIMENTS

Before entering into the explanation of the method of the present invention, the SWS system according to the present applicant will be further explained with reference to FIG. 1.

Figure 1:
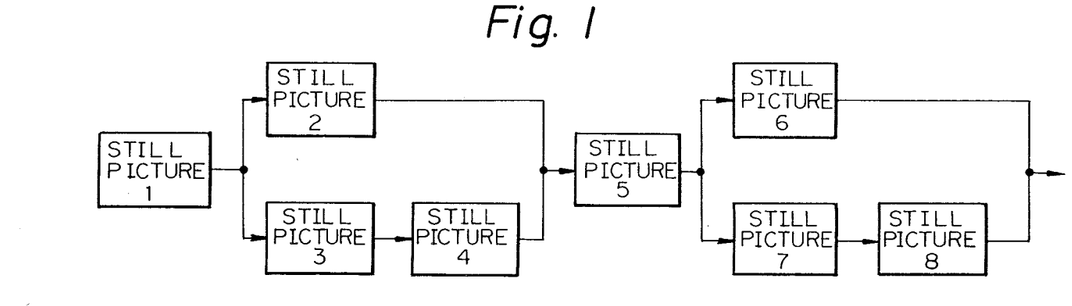
FIG. 1 is a diagram showing an example of a sequence of a "video soft"

In FIG. 1, an example of a sequence of a "video soft" according to the SWS system is illustrated. Audio informations corresponding to each stationary or still picture of FIG. 1 are shown in Table 1. The "video soft" of FIG. 1 is for educational purposes, and a question is asked of the learner or operator at a step of still picture 1. The question is in the form of an alternative question and if the operator selects the answer corresponding to a still picture 2, the still picture 2 will be reproduced. If the other answer is selected, then a still picture 3, and subsequently, a still picture 4 are reproduced. In addition, further selection between the operations of the system takes place in the same manner.

TABLE 1

| still picture No. | contents of vocal information |
|---|---|
| 1 | select the number of correct answer from the following |
| 2 | right answer; go to the following question |
| 3 | wrong answer; refer to the following comment |
| 4 | explanation of the question (caption of the still picture) |
| 5 | select the number of false answer from this |
| 6 | right answer; go to the next question |
| 7 | wrong answer; refer to the following comment |
| 8 | explanation of the question (caption of the still picture) |

Figure 2:
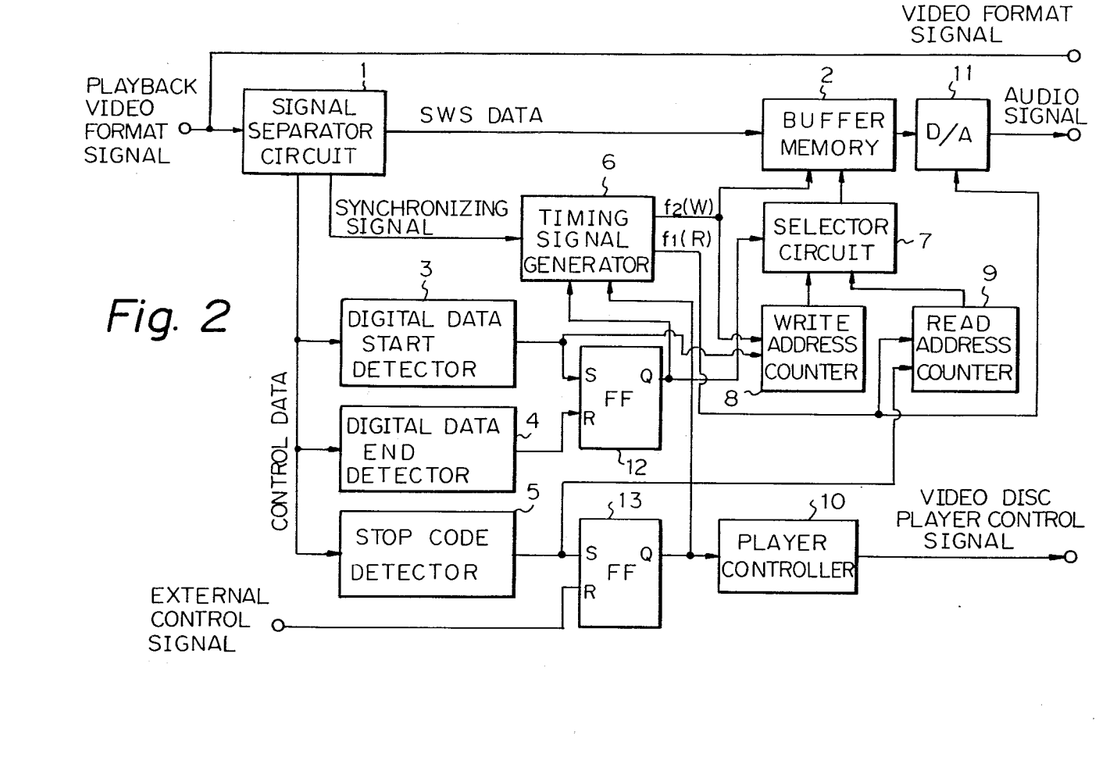
FIG. 2 is a block diagram showing an example of the playback system for a video format signal proposed by the present applicant.

FIG. 2 is a block diagram of an example of the SWS type playback system. As shown, a playback video format signal is applied to a signal separator 1 in which a synchronizing signal, control data, and SWS data (audio information) are separated from each other. The SWS data is applied to a buffer memory 2 for a time axis expansion. The control data is applied to a digital data start detector 3, a digital data end detector 4, and a stop code detector 5. The digital data start detector 3 detects a digital control signal indicative of the start of the SWS data. The data end detector 4 detects a digital control signal indicative of the completion of the SWS data, and the stop code detector 5 detects a digital control signal indicative of the still picture.

The synchronizing signal separated at the signal separator 1 is then applied to a timing signal generator 6 which generates a write timing signal $f_2(W)$ for determining the timing of writing of the SWS data into the buffer memory 2, and a read-out timing signal $f_1(R)$ for the timing of the reading-out the data from the buffer memory 2. A selector circuit 7 is provided to determine the address of the buffer memory during the writing and reading-out of the data. A write address counter 8 and a read-out address counter 9 are provided to respectively count up the timing signal $f_2(W)$ and the timing signal $f_1(R)$ from the timing signal generator, and outputs signals respectively from the write address counter 8 and the read-out address counter 9 are applied to the selector circuit 7 to perform the address selection.

An R-S flip-flop 12 (simply referred to as FF hereafter) to be set at the detection timing of the start timing detector 3, is provided to generate a high level output signal during a period of playing back of the SWS data, at the Q output terminal. The Q output signal is used for controlling the operation of the timing signal generator 6 and the selector circuit 7.

A flip-flop (FF) 13 adapted to be set at the detection timing of the stop code detector 5, is provided and reset by an external control signal. A Q output signal of the FF 13 is applied to the timing signal generator 6 and to a player (player back system) controller 10. By an output signal of the player controller 10, various playback operations such as the playing back of the still picture and the playback of the motion picture, are controlled.

The output signal of the digital start detector 3 is also applied to a reset terminal of the write address counter 8 and the output signal of the stop code detector 5 is applied to a reset terminal of the read address counter 9. A digital data from the buffer memory 2, which is expanded in the time axis, is applied to a digital to analog (D/A) converter 11 for converting a digital input signal into an analog signal, and then decoded to an audio signal.

Further, the playback video format signal is directed to a masking circuit (not shown), in which the signal level of the blocks for the audio information is clamped, for example, to a black level so as to mask the audio information signal, and then outputed as a playback video signal.

Figure 3:
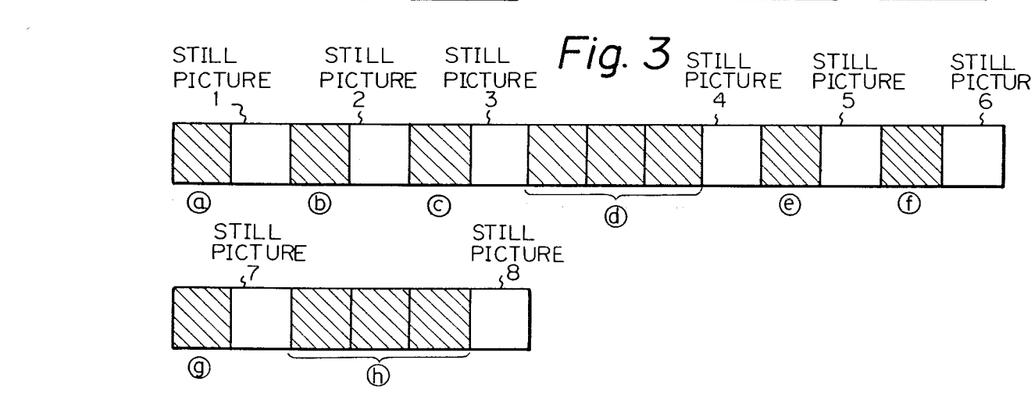
FIG. 3 is a diagram showing an example of a recording pattern of the video format signal proposed by the present applicant.

FIG. 3 is a schematic diagram of the format of recording signal on the recording disc for the educational "video soft" of FIG. 1.

As shown, in frames (a) through (h) which are indicated by hatching lines, the audio contents of Table 1 is recorded in digital form and at the same time treated by the time axis compressing. In this example, the audio information (SWS data) is recorded in all of the blocks of one frame of a two-dimensional picture obtained from the video format signal. As described above, all of the frames a through h indicated by the hatch line are masked in the playback system. In addition, at the start and the end of this SWS data, there are respectively provided the digital start signal and the digital end signal. Further, the stop code is added to each of the still pictures.

Referring to FIGS. 1 and 3, the operation of the system of block diagram of FIG. 2 will be further explained. When the digital start signal is detected from the digital start signal detector 3, from the control data separated at the signal separator 1, the FF 12 is set and a clear signal is applied to the write address counter 8. By this operation, the selector circuit 7 selects the output signal of the counter 8 and the SWS data is in turn written starting from the 0 address of the buffer memory 2 in accordance with the timing signal $f_2(W)$. When the digital data stop signal is detected by the digital data stop signal, the FF 12 is reset and the selector circuit 7 selects the output signal of the read address counter 9, and consequently, the read address of the buffer memory 2 is designated.

Is is to be noted that the synchronizing signal forms an input signal of the timing signal generator circuit 6, and the write timing signal $f_2(W)$ is generated when the level of the Q output signal of the FF 12 is at high level with regard to the vertical and horizontal synchronizing signals, and the read-out timing signal $f_1(R)$ is produced when the level of the Q output signal of the FF 13 is at high level with regard to the vertical and horizontal synchronizing signals. Thus, the SWS data is in turn written into each address of the memory 2 with the period of the generation of the timing signal $f_2(W)$.

When the stop code is detected by the stop code detector 5, the FF 13 is set and at the same time the read address counter 9 is cleared, and the SWS data is in turn read-out from the address 0 of the memory 2. The read-out timing signal $f_1(R)$ has a frequency equal to the sampling frequency of the conversion of the analog audio signal into the digital signal, and the data is in turn read-out from the memory 2 at this timing and the expansion into the real time axis takes place. The thus produced signal forms the playback audio signal through the D/A converter 11.

The player controller 10 is operated in accordance with the set timing of the FF 13 and the player is operated to reproduce the still picture. In addition, when the external reset signal is applied to the reset terminal of the FF 13, the player is then operated at the normal speed operation.

Assume that a question of a certain learning subject is raised at the time of the still picture 1 of FIGS. 1 and 3, and the system is to be operated to move to the still picture 2 if the answer of the learner is right, and to the still picture 3 and further to the still picture 4 in which the hint of the answer and the explanation are given, in case the answer from the operator is wrong. At first, when the digital start signal of the SWS data a (FIG. 3) is detected at the digital start detector 3, then the digital start signal is in turn stored in the buffer memory 2. Then, when the digital data end signal is detected at the digital data end detector 4, the writing of the data into memory is terminated. When the stop code is detected by the stop code detector 5 at the top end of the still picture 1, then the SWS data is read-out from the memory 2 with the time axis expansion operation, and the player plays back the still picture 1.

If, after that, an answer is input by the operator, the player selects, in accordance with this answer, one of the operations of write in and reading-out of the SWS data b and the playback of the still picture 2, or the write and reading-out of the SWS data c and the playback of the still picture 3. In the case of the latter operation, the write and reading-out of the SWS data d, and the display of the still picture 4 is further performed. Thus, the playback of the pictures with sound is in turn performed in accordance with the answer from the operator.

Referring to the block diagram of FIG. 4, an embodiment of the recording system for producing the recording video format signal according to the present invention will be explained hereinafter.

As shown, the analog audio signal is applied to an analog to digital (A/D) converter 20 in which the input signal is converted to a digital signal. An output digital signal from the A/D converter 20 is written in the buffer memory for the time axis compression at the sampling frequency of $f_1(R)$. Since the read-out from this buffer memory 20 is performed at a frequency $f_2(W)$ which is higher than the sampling frequency $f_1(R)$, the time axis compression becomes possible.

The control signal, as the control information, includes discrimination codes for discriminating previously selected words, phrases, and sentences which are to be often used, and picked up from the audio information, other than the SWS data, start and end signals, the stop code signal.

A series of video informations which are related to each other and the SWS data signal which are treated through the time axis compression process at the buffer memory 21 are applied to the switching circuit 22. The control of the timing of the switching circuit 21 is controlled by a timing signal generator circuit 23. The read and write timing of the buffer memory 21 is also controlled by this timing signal generator circuit 23. In the timing signal generator circuit 23, an internal oscillator is synchronized to the synchronizing signal of the input video signal, and various control signals are produced according to the external control signal. By this construction, a video format signal to be recorded is produced at an output terminal of the switching circuit 22.

Figure 4:
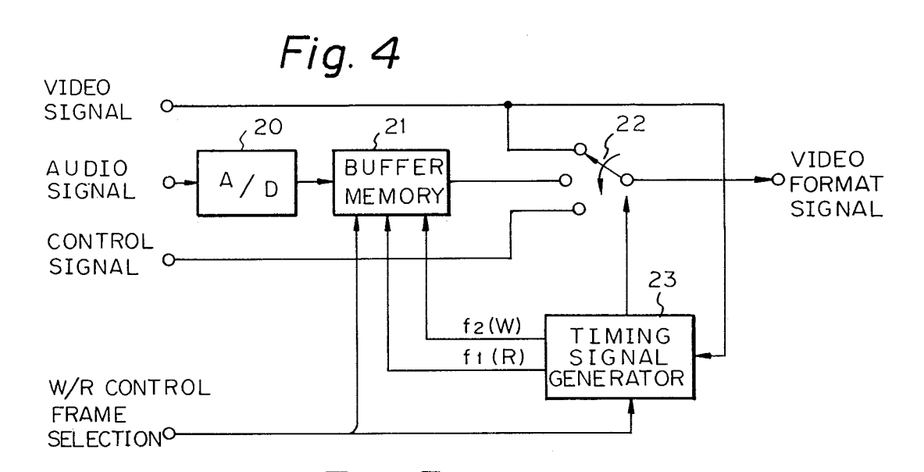
FIG. 4 is a block diagram showing an example of the recording system according to the present invention.
Figure 5:
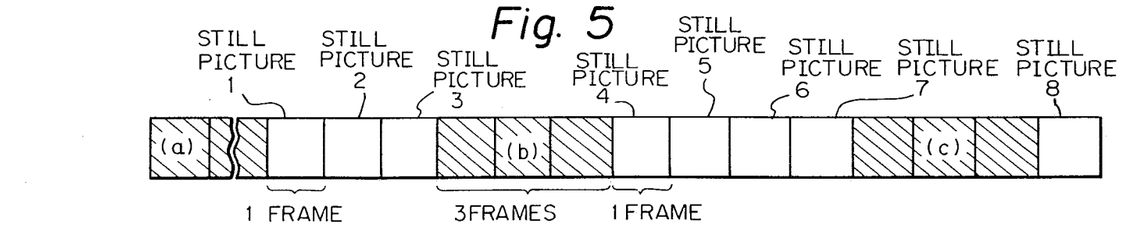
FIG. 5 is a diagram showing an example of a recording pattern of the video format signal obtained by the system of FIG. 4.

The schematic diagram of FIG. 5 shows an example of the video format signal generated by the circuit illustrated in the block diagram of FIG. 4. As shown, this video format signal includes a series of co-related video informations (still pictures 1 to 8) and the SWS data of frequently used words previously picked up are inserted and recorded along with discrimination codes, in several frames (a) (single frame can be enough) in front of the sequential video informations.

Assume that the SWS data of this case includes vocal informations of the following Table 2.

TABLE 2

| buffer No. | code of buffer No. | start address of buffer memory | contents of vocal inf. |
|---|---|---|---|
| 1 | $31_{16}$ | $00000_{16}$ | the following |
| 2 | $32_{16}$ | $01000_{16}$ | from |
| 3 | $33_{16}$ | $02000_{16}$ | corect |
| 4 | $34_{16}$ | $03000_{16}$ | answer |
| 5 | $35_{16}$ | $04000_{16}$ | the number of |
| 6 | $36_{16}$ | $05000_{16}$ | select |
| 7 | $37_{16}$ | $06000_{16}$ | please |
| 8 | $38_{16}$ | $07000_{16}$ | right answer |
| 9 | $39_{16}$ | $08000_{16}$ | question |
| 10 | $3A_{16}$ | $09000_{16}$ | go to |
| 11 | $3B_{16}$ | $0A000_{16}$ | wrong answer |
| 12 | $3C_{16}$ | $0B000_{16}$ | comments |
| 13 | $3D_{16}$ | $0C000_{16}$ | refer to |
| 14 | $3E_{16}$ | $0D000_{16}$ | the sign of |
| 15 | $3F_{16}$ | $0E000_{16}$ | |

(notes: write code: $57_{16}$, resd-out code: $52_{16}$)

The still pictures 1 through 3 are recorded in the next three frames. In the following three frames, a "explanation of the question" corresponding to a still picture 4 or a part of the explanation of still picture 5 which can not be composed by using the high occurrence words in Table 2, are recorded. Further, in the following three frames (c) after the still pictures 4 through 7, an "explanations of the question" corresponding to the still picture 8 which also cannot be composed by the high occurence words of FIG. 2, are recorded. In a frame after these frames, the still picture 8 is recorded.

Figures 6, 6A:
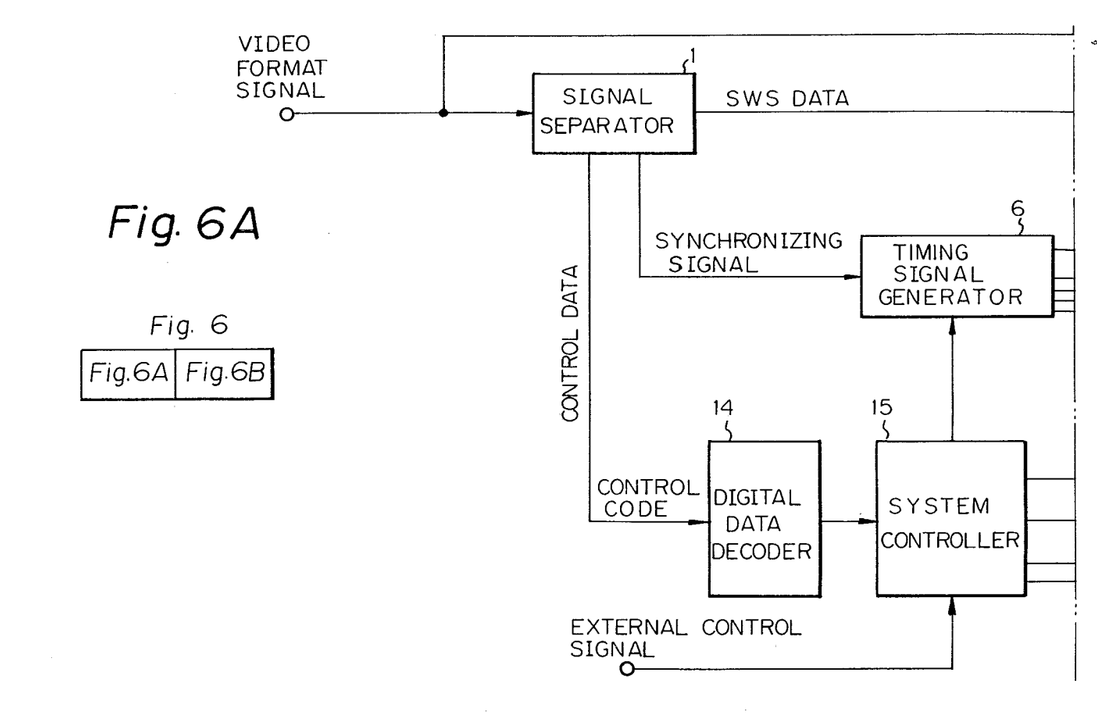
FIG. 6 is a block diagram showing an example of the playback system of the present invention.
Figure 6B:
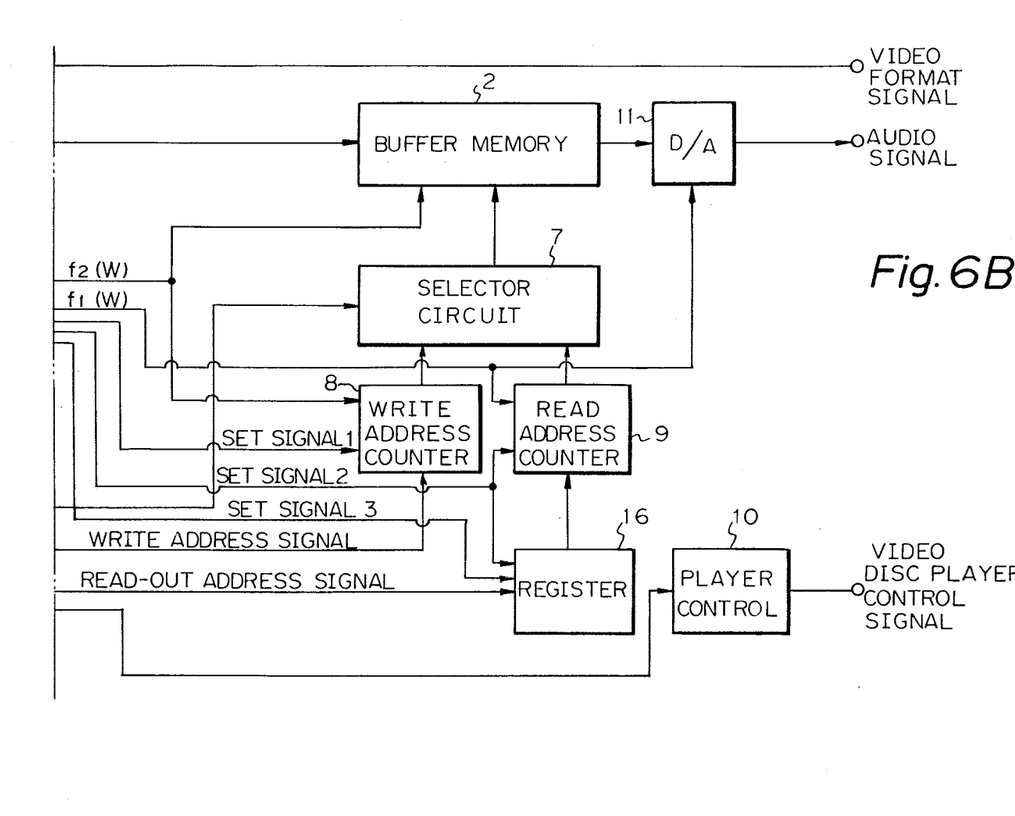

The block diagram of FIG. 6 shows an example of the playback system for playing back the information on a video disc on which the video format signal produced in the manner stated above is recorded. In FIG. 6, like reference numerals used in FIG. 2 denote like parts, and the explanation thereof are omitted.

In the case of this circuit construction, there is provided a digital data decoder 14 which detects a control data, as the control information in the playback signal. The control data decoded by the digital data decoder is applied to a system controller 15 which produces a control signal for the timing signal generator circuit 6, and the address signal for the write address counter 8. A register 16 is provided to in turn transfer the addresses previously set by the system controller 15, to the read address counter 9. The player controller 10 is operated in accordance with the control signal from the system controller 15.

The playback signal is applied to the signal separator 1 in which the SWS data, synchronizing signal, and control data are separated from each other. The SWS data is in turn written into the buffer memory in accordance with the address signal designated by the write address counter 8. The control data is decoded at the decoder 14 to a control signal corresponding to the input code, and the control signal is applied to the system controller 15. The generation of the timing signal in the timing signal generator 6 is controlled by the input control signal. Further, the selection between the write mode and the read-out mode of the buffer memory is controlled by the operation of the selector circuit 7 operated by the system controller 15. The start address of the write mode and the start address of the read-out mode are respectively applied to the data input terminal of the write address counter 8 and the data input terminal of the register 16. The set signal 1 from the timing signal generator 6 is applied to the load input terminal of the write address counter 8 which set the state of the data input terminal thereof when the active negative logic signal is applied to the load terminal thereof. In other words, the start address for the data issued from the system controller 15 to the buffer memory 2 is set at the counter 8 and the SWS data is in turn written in the buffer memory from the start address set in the counter 8.

The set signal 2 from the timing signal generator 6 is applied to the load input terminal of the counter 6, and, at the same time, to the control terminal of the register 16. The counter 9 sets the data being applied to the data input terminal thereof when an active negative logic signal is applied to the load terminal thereof. In other words, the start address for the reading-out of the data from the buffer memory is designated. The register 16 sets the data being applied to the data input terminal thereof when a clock signal is applied to the control input terminal thereof. This register 16 has a storage capacity for storing sixteen start addresses at one time, and in turn stores the data each time of application of the clock signal.

The set signal 3 produced by the timing signal generator circuit 6 is applied to another clock terminal of the register 16. The register 16 is constructed to provide the data in order, when a signal is applied to this other clock terminal. In conclusion, by the set signal 3 from the timing signal generating circuit 6, the start addresses for each SWS data outputed from the system controller is in turn stored in the register 16. Further, the SWS data is read-out by setting the read-out start addresses. These addresses are read-out by setting addresses in the read address counter 9 in the order of storing in the register 16, by means of the set signal 2 generated from the timing signal generator 6.

Table 2 shows the relationship among the buffer numbers corresponding to each words, phrases and corresponding codes, and start addresses of the buffer memory 2.

When the player starts the playing back operation, the write code $57_{16}$ is first detected by the detector 14, and the write control command is then generated. Next, when the code $31_{16}$ corresponding to the buffer No. 1 is detected similarly, the start address "$00000_{16}$" of memory 2 is set in the write address counter 8 by means of the operation of the system controller 15. Then the SWS data are in turn stored in the buffer memory 2 at the clock frequency of $f_2(W)$. In the case of the example, the data up to the buffer No. 13 are stored in the buffer memory 2 in the same manner as above. In the format of FIG. 5, the SWS compressed data of the vocal information from the buffer No. 1 to the buffer No. 14 are recorded in the frames (a) indicated by the oblique lines. These data are, in the buffer memory 2, stored in the form of the memory map shown in FIG. 7.

Figures 7, 8:
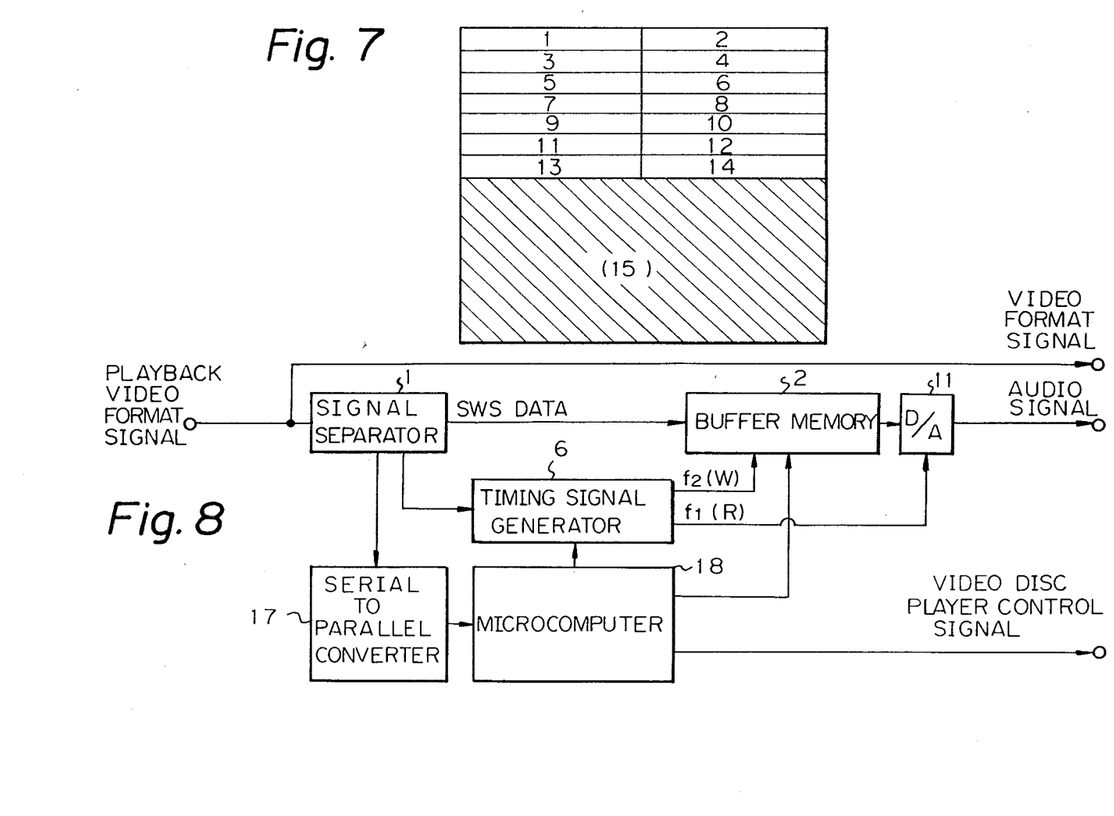
FIG. 7 is a diagram showing an example of memory map in the buffer memory.
FIG. 8 is a block diagram showing another example of the playback system of the present invention.

Next, in the case of the playback of the "video soft" shown in FIG. 1, the frames shown by the hatch lines (a) of FIG. 5 are as previously mentioned, stored in the buffer 2 as illustrated in FIG. 7. Subsequently, when the read-out code $52_{16}$ is detected by the digital decoder 14 at the time of the still picture 1, the system is switched to the read-out state. The subsequent buffer numbers are in turn read-out and the corresponding start addresses of the buffer memory 2 are in turn stored in the register 16. In the case, since the vocal information is "please select the correct answer from the following", the codes corresponding to the buffer numbers 1, 2, 3, 4, 5, 6, and 7 are read-out, and corresponding start addresses of the buffer memory 2 are in turn stored in the register 16, and then the start address is read-out by setting it from the register to the read address counter 9.

Then if the operator selects the correct answer, the still picture 2 and still picture 5 are reproduced in turn.

On the other hand, if the operator selects the wrong answer, the still pictures 3, 4 and, subsequently, the still picture 5 are reproduced.

Assume that the operator gave the wrong answer. Then the still picture 2 is skipped and the still picture 3 will be reproduced instead of the still picture 2. Since the voice information should be "wrong answer, please refer to the following explanations", the codes corresponding to the buffer numbers 11, 7, 13, 1, 12 are read-in, the corresponding start addresses of the buffer memories are set in the register 16, and each address is set in the read address counter 16. In this way, each piece of the vocal information is in turn reproduced.

Next, the portion illustrated by the hatch lines (b) of format diagram of FIG. 5 is reproduced and when the SWS vocal buffer No. 15 is detected subsequent to the write command code $57_{16}$ by the digital data decoder 14, the start address of the buffer memory corresponding to the SWS vocal buffer No. 15 is set in the write address counter 8, and the following SWS compressed vocal data are in turn stored in the buffer memory 2.

Subsequently, when the still picture 4 is reproduced, the start address of the buffer memory 2 corresponding to the buffer No. 15 is set in the register 16, and subsequently, in the read address counter 9, and SWS compressed vocal data is read-out at the clock timing of $f_1(R)$.

In this way, the words stored in the buffer memory 2 are combined in the desired order to form vocal information. In case the above combination is sufficient to express the information, the vocal information is issued from the buffer memory 2, and if the simple combination of the stored words is not sufficient to express the idea, the data is stored and processed once and the vocal information is issued at the time of reproduction of the still picture.

In the case of the above embodiment, the functions performed by the system controller 15, register 16, write address counter 8, read address counter 9, selector circuit 7, and player controller 10 can be performed by means of a software process of a microcomputer.

Figure 9:
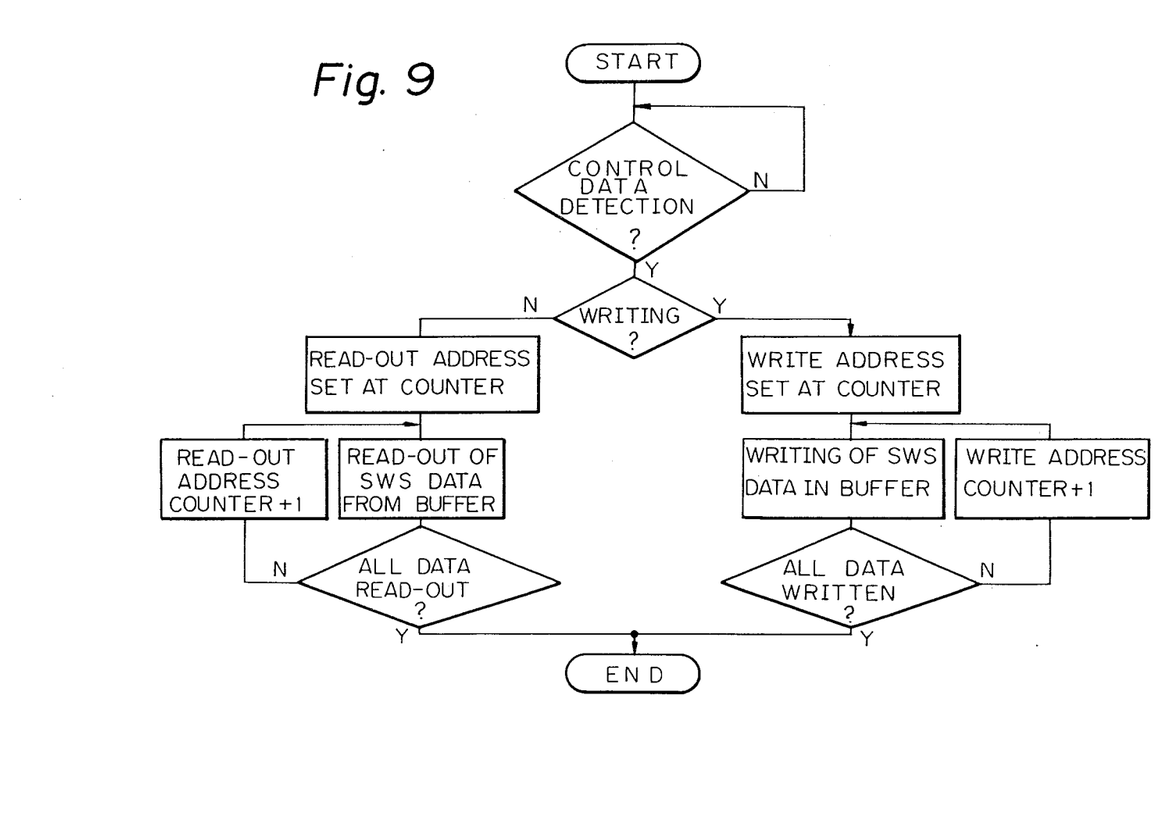
FIG. 9 is a flowchart showing the order of operation of the system of FIG. 8.

The construction of the system of such a case is illustrated in the block diagram of FIG. 8. The flowchart of the function of the system of FIG. 8 is illustrated in FIG. 9.

Referring to FIG. 8, the operation of the system of this type will be explained hereinafter. As shown, the control data separated at the signal separator circuit 1 is directed to the serial to parallel converter 17 and converted to a parallel data per unit code and then applied to the microcomputer 18. In the microcomputer 18, the code is analyzed and in the case of writing, the desired address is set in the write address counter area, and after that, the contents of the address counter area is issued to the buffer memory 2, and at the same time a control signal is applied to the timing signal generator circuit 6 so that the latter produces a write pulse $f_2(W)$.

In the case of reading-out, the desired address is set in the read address counter area, and after that the control signal is applied to the timing signal generating circuit 6 so that the read-out pulse $f_1(R)$ is generated. The timing signal generator 6 is constructed to produce the write pulse signal $f_2(W)$ and the read-out pulse signal $f_1(R)$ from the synchronizing signal separated from the signal separator 1, in accordance with the control signal produced by the microcomputer 18.

The SWS data separated by the signal separator 1 is stored in the buffer memory 2 in accordance with the write pulse signal $f_2(W)$ and read-out from the buffer memory 2 in accordance with the read-out pulse signal $f_1(R)$. Then the SWS data is converted to an analog signal in the digital to analog (D/A) converter 11. On the other hand, the control as to whether the vocal informations is output from the buffer memory 2 or from the fixed rewriting area, and the control of each address can be performed according to the process shown in the flowchart of FIG. 9. If, in this way, the control process is performed by a microcomputer, the construction of the system (hardware) can be simplified and a lower cost of the system is possible.

It will be appreciated from the foregoing, according to the present invention, that the vocal informations which commonly appear throughout the "video soft" are picked up per word, phrase, or the sentence, and the codes and SWS data corresponding to each word, etc, picked up are recorded in the beginning portion of the video disc, or in the start portion of each unit of the "software". Therefore, by reproducing these data at first and storing them in the buffer memory, and then by picking up the desired vocal information from the buffer memory at the time of reproduction of the still picture, a high density recording of the video disc can be enabled. This is because the recording of the SWS data corresponding to each still picture, which was necessarily carried out in the conventional system, is no longer necessary.

Further, in the case of the playback operation of the conventional system, the reproduction of the SWS data is performed before each still picture, and such has resulted in the reproduction of the SWS data in the still picture, that is, noise in the picture. On the other hand, in the case of the present system, since the reproduction of the SWS data for each still picture is eliminated, noise of the still picture is greatly reduced.

Moreover, the use of a ROM for the same function is conceivable. However, as in the previously mentioned case, the use of a ROM for storing the picked up words is also inconvenient since the pickup of vocal information which is common to all of various sorts of "software" is not possible and a change of ROM is required at every time the change of the disc is required. Such a requirement is impractical. Further, in the case of the expression which can not be formed by the combination of the common words or phrases, the vocal information must be recorded before each still picture in the form of the SWS data, and the use of RAM as the temporary storing buffer is necessary. However, a switch control between the operations of RAM and ROM becomes necessary in such a case.

It will be appreciated from the foregoing, since the system according to the present invention only requires the control of a RAM that the construction of the system can be simplified.

In addition, it is needless to say that the number of the words to be picked up is not limited to fourteen, which was the case of the preferred embodiment.

What is claimed is:

1. A method for recording, on a recording medium, a video format signal having a plurality of frames for a series of video information and a series of corresponding audio information, comprising the steps of:
    recording at least in a frame before frames for the video information time axis compressed data of a plurality of linguistic units extracted from said series of audio information and which frequently appear in said audio information;
    recording memory addresses for said plurality of linguistic units for use in a playback system in which said plurality of linguistic units are to be stored; and
    recording remaining parts of said audio information in frames among frames for said series of video information with data for designating selected ones of said memory addresses corresponding to linguistic units to be combined with said remaining audio information to compose a desired sentence for each of said video information.

2. A method for recording and playing back, on and from a recording medium, a video format signal having a plurality of frames for a series of video information and a series of corresponding audio information, comprising the recording steps of:
    recording at least in a frame before frames for said series of video information time axis compressed data of a plurality of linguistic units extracted from said series of audio information and which frequently appear in said audio information;
    recording memory addresses for said plurality of linguistic units for use in a playback system in which said plurality of linguistic units are to be stored; and
    recording remaining parts of audio information in frames among frames for said series of video information with data for designating selected ones of said memory addresses corresponding to desired ones of said linguistic units to be combined with said remaining audio information to compose a desired sentence for each of said video information;
    said method further comprising the playback steps of:
    playing back said recording medium to reproduce said video format signal including said series of video information and said series of audio information;
    separating said audio information from said video format signal and storing said plurality of linguistic units in memory areas of said playback system designated by said recorded memory addresses; and
    assembling desired ones of said plurality of linguistic units in accordance with said data for designating memory addresses, for reproducing desired sentences corresponding to each of said video information by a time axis expansion operation.

* * * * *